(12) United States Patent
Wercholuk

(10) Patent No.: US 11,845,484 B2
(45) Date of Patent: Dec. 19, 2023

(54) MOTORIZED BEACH CART

(71) Applicant: Michael Wercholuk, Covington, LA (US)

(72) Inventor: Michael Wercholuk, Covington, LA (US)

( * ) Notice: Subject to any disclaimer, the term of this patent is extended or adjusted under 35 U.S.C. 154(b) by 584 days.

(21) Appl. No.: 17/123,564

(22) Filed: Dec. 16, 2020

(65) Prior Publication Data
US 2022/0185353 A1 Jun. 16, 2022

(51) Int. Cl.
*B62B 5/00* (2006.01)
*B62B 3/02* (2006.01)
*B62B 5/06* (2006.01)

(52) U.S. Cl.
CPC ............ *B62B 5/005* (2013.01); *B62B 3/022* (2013.01); *B62B 5/0053* (2013.01); *B62B 5/064* (2013.01); *B62B 2202/52* (2013.01)

(58) Field of Classification Search
CPC .............................. B62B 5/005; B62B 3/022
See application file for complete search history.

(56) References Cited

U.S. PATENT DOCUMENTS

| | | | | |
|---|---|---|---|---|
| 6,276,471 B1* | 8/2001 | Kratzenberg | ......... | B62B 5/0026 180/19.1 |
| 7,210,545 B1* | 5/2007 | Waid | ......... | B62B 3/12 180/19.1 |
| 8,297,384 B2* | 10/2012 | Wanger | ......... | B62K 27/003 180/11 |
| 8,746,377 B1* | 6/2014 | Dunbar | ......... | B62B 5/0003 280/30 |
| 10,583,852 B2* | 3/2020 | Fitzwater | ......... | B62B 7/008 |
| 11,465,665 B2* | 10/2022 | Sturgeon | ......... | B62B 9/104 |
| 2022/0089207 A1* | 3/2022 | Gavin | ......... | B62B 3/025 |

* cited by examiner

*Primary Examiner* — Kevin Hurley
(74) *Attorney, Agent, or Firm* — Norton IP Law Firm LLC; Taylor M. Norton

(57) ABSTRACT

The present disclosure provides a motorized beach cart for transporting beach necessities. The motorized beach cart includes a collapsible frame and a handle is hingedly connected to the collapsible frame. The motorized beach cart includes a battery electrically wired to an electric motor disposed within a protective casing, and at least a first USB port is provided within an exterior wall of the protective casing. A drive assembly is disclosed which is adapted to removably connect to a back end of a beach cart.

15 Claims, 17 Drawing Sheets

MOTORIZED BEACH CART

BACKGROUND OF THE INVENTION

Field of the Invention

The present invention generally relates to a beach cart device and more particularly relates to motorized beach cart devices.

Description of the Related Art

People in many different cultures around the world often enjoy a day's outing at the beach or park. After driving to public beach areas, beachgoers often find parking a considerable distance from the desired beach location that was selected for their day at the beach. Such distance often entails a long walk across the sand which can be particularly burdensome when handling a combination of children, cell phones, large beach towels, beach chairs, children's toys, umbrellas, extra clothes, coolers filled with food and drink, and other paraphernalia for the beach.

Currently, a common method for transporting such children and beach items is a conventional cart that is either pushed or pulled by one of the beachgoers. Without a cart, wagon or similar device, many adults are left uncomfortably holding more than they can carry, and the beachgoer frequently makes several round trips, all the while attempting to maintain control over the operation. Various different types of such beach carts are well known. Conventional beach carts are often loaded down bearing the weight of children and beach items causing the wheels of the wagon to embed into the soft sand, thus requiring the beachgoer to exert significant force in pushing or pulling the loaded wagon across the beach. Most people would prefer to spend less time transporting beach necessities to a location on the beach. There is a need for a portable beach cart device for beachgoers to easily and efficiently transport children and beach items to their desired destination at the beach.

Many types of beach carts and wagons have been proposed, but many of these presently available are similar to urban shopping carts and are not motorized or suited for the task. These conventional carts and wagons are generally supported by four (4) wheels connected to a rigid frame that is bulky, unwieldy and usually difficult to transport in a vehicle. A need therefore exists for a beach cart that is easy to transport in a vehicle while also providing an efficient manner of moving beach items from the vehicle to and from the desired beach location without bulky, difficult maneuvering, multiple trips or over-exertion.

Other beach carts and wagons are generally supported by two (2) wheels and the load is tilted in order to pull the entire load. The tires of these two-wheeled carts have insufficient surface area to prevent sinking into soft sand, and when loaded down, these carts become difficult to manage on the soft sand terrain. A need therefore exists for a beach cart that provides a safe, efficient manner of easily moving beach necessities from a vehicle or residence to and from the desired beach destination without multiple trips or over-exertion.

Various attempts have been made over the years to solve problems found in transporting beach items. U.S. Pat. No. 4,796,909 issued to Kirkendall on Jan. 10, 1989 discloses a four wheeled, pull-type wagon specially designed to carry folding chairs, ice chests, firewood, and other small items. This device, which is manually controlled and steered, is especially difficult to reverse when heavily loaded.

U.S. Pat. No. 5,988,671 issued to Abelbeck, et al. on Nov. 23, 1999 discloses a collapsible cart including a bottom frame suitable for supporting coolers and the like, but the cart is limited to two wheels and is non-motorized, thereby requiring significant exertion of the beachgoer when trying to maneuver it across a soft sandy terrain.

U.S. Pat. No. 7,210,545 issued to Waird on May 1, 2007 discloses a motorized beach cart having a rigid cargo frame that is difficult to transport in a vehicle in order to get it to the beach location where it is needed. Such beach cart also includes a geared motor assembly that is unprotected from and susceptible to sand and water.

More recently, U.S. Pat. No. 9,908,570 issued to Mayers on Mar. 6, 2018 discloses a three-wheeled motorized beach wagon having a switch and throttle lever located within the handle of the wagon, and the frame of the wagon is partially collapsible with a central hinge at a midpoint of the frame consisting of U-shaped frame members forming a platform without any walls. The central hinge point is susceptible to buckling, and the motor and axle are permanently mounted to the frame and are unprotected from and susceptible to sand and water.

While these units may be suitable for the particular purpose employed, they would not be as suitable for the purposes of the present invention as disclosed hereafter.

The aforementioned devices suffer from various problems in that they are not easily movable through loose sand presently found on many beaches.

Each patent identified above is incorporated herein by reference in its entirety.

It is therefore a general object of the present invention to provide an improved beach cart having at least four wheels and a source of power that drives a pair of the wheels to assist a user in transporting the beach wagon and items contained therein onto a sandy surface such as a beach.

It is another general object of the invention to provide a motorized drive assembly that is removably connected to a beach cart. Beach carts disclosed herein are collapsible for easy transport in an automobile.

It is yet another object of the invention disclosed herein to provide for a motorized beach cart with a drive assembly that is less susceptible to sand and water.

As disclosed in this application, the inventor has discovered novel and unique devices and methods for efficient and less strenuous transporting of beach items, which exhibit superlative properties without being dependent on heavy, bulky, rigid or complex components.

Embodiments of the present invention provide for devices and methods and disclosed herein and as defined in the annexed claims which provide for improved cart transportation, operation and maneuverability features in order to easily and efficiently transport children and beach items across soft sandy terrain to their desired destination at the beach.

SUMMARY OF THE INVENTION

It is one prospect of the present invention to provide one or more novel devices of simple but effective construction which can be applied to many environments to efficiently and effectively transport beach items with a motorized beach cart.

The following presents a simplified summary of the present disclosure in a simplified form as a prelude to the more detailed description that is presented herein.

Therefore, in accordance with embodiments of the invention, there is provided a motorized beach cart having a collapsible frame. The collapsible frame has a front end opposite a back end. The collapsible frame includes a transporting compartment positioned between the front end and the back end. The transporting compartment is adapted to store and handle beach items. Preferably, the back end of the collapsible frame has a rigid square tube oriented laterally to the collapsible frame.

Preferably, the motorized beach cart includes a pair of swivel wheels oriented on opposite sides of the front end of the collapsible frame. A handle is hingedly connected to the front end of the collapsible frame. The handle is adapted for a grip of a hand of a user for pulling and steering the motorized beach cart.

In one embodiment, the motorized beach cart includes a drive assembly, which includes a rigid frame having a pair of clamps that are removably connected to the back end of the collapsible frame.

In a preferred embodiment, the motorized beach cart includes a drive assembly which includes a rigid frame having a front end where the front end comprises a c-channel. The c-channel is adapted to receive and secure the rigid square tube such that the drive assembly is removably connected to the back end of the collapsible frame. The drive assembly includes an electric motor located within a protective casing. The protective casing is mounted to the rigid frame. The electric motor is operatively connected to at least two drive shafts which extend outward of the protective casing. Each of the at least two drive shafts are adapted to rotate in a clockwise direction and a counterclockwise direction to propel the motorized beach cart in a forward direction or a backward direction. The motorized beach cart includes a battery electrically wired to the electric motor within the protective casing. The drive assembly includes at least a first USB port located within an exterior wall of the protective casing and is electrically connected to the battery. The at least a first USB port is adapted to receive a charging power cord, which is adapted to charge the battery of the drive assembly. The at least first USB port is also adapted to receive a charging cable, which is adapted to charge a cell phone. The motorized beach cart includes at least a first pair of drive wheels having treads oriented on an exterior surface thereon. Each drive wheel of the at least a first pair of drive wheels are rotatably connected to one of the at least two drive shafts. An accelerator switch is mounted to the handle and is removably electrically coupled to the electric motor. The accelerator switch is adapted to electrically activate the electric motor to rotate the at least two drive shafts.

In one embodiment, the drive assembly further includes an LCD screen, which is adapted to display a charge level of the battery.

In another embodiment, the motorized beach cart further includes a speed switch, which is electrically connected to the electric motor. The speed switch is adapted to rotate each of the at least two drive shafts at a slow speed and a fast speed, at an option of the user.

In yet another embodiment, the motorized beach cart further includes a directional switch electrically connected to the electric motor. The directional switch is adapted to rotate each of the at least two drive shafts in the clockwise direction and the counterclockwise direction.

In one embodiment, the motorized beach cart further includes at least a second pair of drive wheels. Each of the at least a second pair of drive wheels are operatively connected to each of the at least two drive shafts. Each of the at least a second pair of drive wheels are rigidly connected to each of the at least a first pair of drive wheels.

In a preferred embodiment, a drive assembly in accordance with embodiments of the invention is presented. The drive assembly includes a rigid frame having a pair of vise clamps removably attachable to a back end of a frame member of a collapsible beach cart. The collapsible beach cart has a handle adapted for a grip of a hand of a user for pulling and steering the collapsible beach cart. The drive assembly includes an electric motor located within a protective casing fixed to the rigid frame. The electric motor is operatively connected to at least two drive shafts which extend outward of the protective casing. Each of the at least two drive shafts are adapted to rotate in a clockwise direction and a counterclockwise direction to propel the collapsible beach cart in a forward direction or a backward direction. The drive assembly includes a battery, which is electrically wired to the electric motor within the protective casing. At least a first USB port oriented within an exterior wall of the protective casing and electrically connected to the battery. The at least a first USB port is adapted to receive a charging power cord, which is adapted to charge the battery. The at least a first USB port is adapted to receive a charging cable, which is adapted to charge a cell phone. The drive assembly includes at least a first pair of drive wheels having treads oriented on an exterior surface thereon, each drive wheel of the at least a first pair of drive wheels are rotatably connected to one of the at least two drive shafts. The drive assembly includes an accelerator switch removably mounted to the handle of the collapsible beach cart. The accelerator switch is electrically coupled to the electric motor and the accelerator switch is adapted to electrically activate the electric motor to rotate the at least two drive shafts.

In one embodiment, the drive assembly further includes an LCD screen, which is adapted to display a charge level of the battery.

In another embodiment, the drive assembly further includes a speed switch electrically connected to the electric motor. The speed switch is adapted to rotate each of the at least two drive shafts at a slow speed and a fast speed, at an option of the user.

In yet another embodiment, the drive assembly further includes a directional switch, which is electrically connected to the electric motor. The directional switch is adapted to rotate each of the at least two drive shafts in the clockwise direction and the counterclockwise direction.

In one embodiment, the drive assembly further includes at least a second pair of drive wheels. Each of the at least a second pair of drive wheels are operatively connected to each of the at least two drive shafts. Each of the at least a second pair of drive wheels are rigidly connected to each of the at least a first pair of drive wheels.

In a preferred embodiment, a motorized beach cart in accordance with embodiments of the invention is provided. The motorized beach cart includes a collapsible frame having a front end opposite a back end. The collapsible frame includes a transporting compartment located between the front end and the back end. The transporting compartment is adapted to store and handle beach items. The motorized beach cart includes a pair of swivel wheels oriented on opposite sides of the front end of the collapsible frame. A handle is hingedly connected to the front end of the collapsible frame. The handle is adapted for a grip of a hand of a user for pulling and steering the motorized beach cart.

A rear fork is rotatably connected to the back end of the collapsible frame. Preferably, at least a first pair of hub motor drive wheels are oriented on opposite sides of the back end of the collapsible frame. Each of the at least first pair of hub motor drive wheels has an electric wheel motor disposed internally. Each electric wheel motor includes a rotor assembly coupled with each of the at least first pair of hub motor drive wheels. Each of the at least a first pair of drive wheels have treads oriented on an exterior surface of each of the at least a first pair of drive wheels. A stator is coupled with the back end of the collapsible frame. The stator is surrounded by the rotor assembly and configured to drive the rotor assembly with electromotive force. The rotor assembly is adapted to rotate in a clockwise direction and a counterclockwise direction. In such preferred embodiment, the motorized beach cart includes a battery located within a protective casing. The protective casing is mounted onto the back end of the collapsible frame and electrically connected to the rotor assembly. At least a first USB port is disposed within an exterior wall of the protective casing and electrically connected to the battery. The at least a first USB port is adapted to receive a charging power cord, which is adapted to charge the battery. The at least first USB port is adapted to receive a charging cable, which is adapted to charge a cell phone. The motorized beach cart includes an accelerator switch mounted to the handle. The accelerator switch is electrically coupled to the rotor assembly and adapted to electrically activate the rotor assembly to rotate each of the at least a first pair of drive wheels.

In one embodiment, the motorized beach cart further includes an LCD screen, which is adapted to display a charge level of the battery.

In another embodiment, the motorized beach cart further includes a speed switch, which is electrically connected to the rotor assembly and adapted to rotate each of the at least a first pair of drive wheels at a slow speed and a fast speed, at an option of the user.

In yet another embodiment, the motorized beach cart further includes a directional switch, which is electrically connected to the rotor assembly and adapted to rotate each of the at least a first pair of drive wheels in the clockwise direction and the counterclockwise direction.

In one embodiment, the motorized beach cart further includes at least a second pair of drive wheels. Each of the at least a second pair of drive wheels are operatively connected to the rotor assembly. Each of the at least second pair of drive wheels is rigidly connected to each of the at least a first pair of drive wheels.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which like numerals throughout the figures identify substantially similar components, in which.

DETAILED DESCRIPTION

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

As used herein, "axis" means a real or imaginary straight line about which a three-dimensional body is symmetrical. A "vertical axis" means an axis perpendicular to the ground (or put another way, an axis extending upwardly and downwardly). A "horizontal axis" means an axis parallel to the ground.

Referring initially to FIGS. 1-10, the basic constructional details and principles of operation of one embodiment of a motorized beach cart 100 according to a preferred embodiment of the present invention will be discussed.

Figure 1:
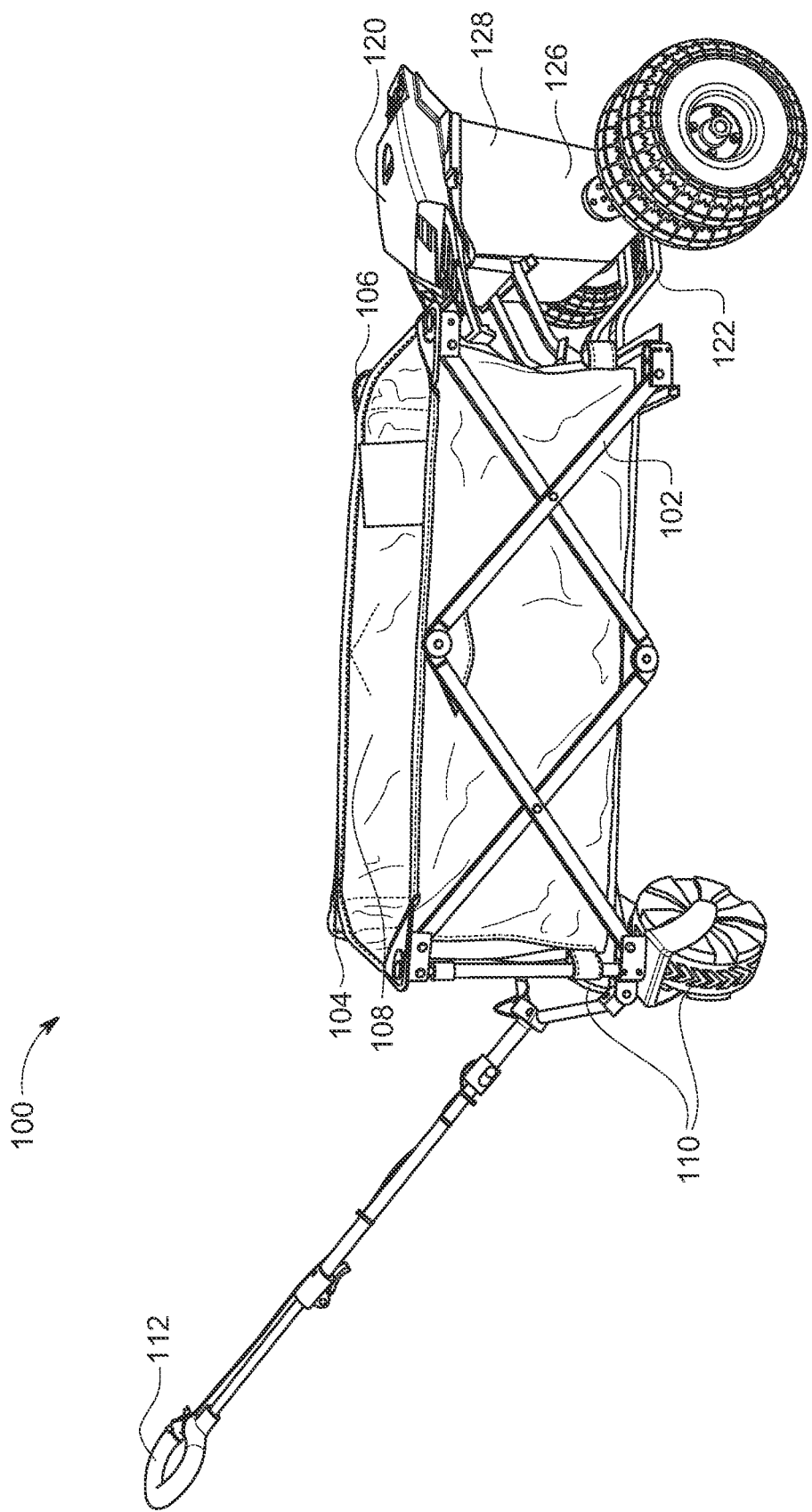
FIG. 1 is a right, partially perspective view of an exemplary motorized beach cart in accordance with an embodiment of the invention.
Figure 2:
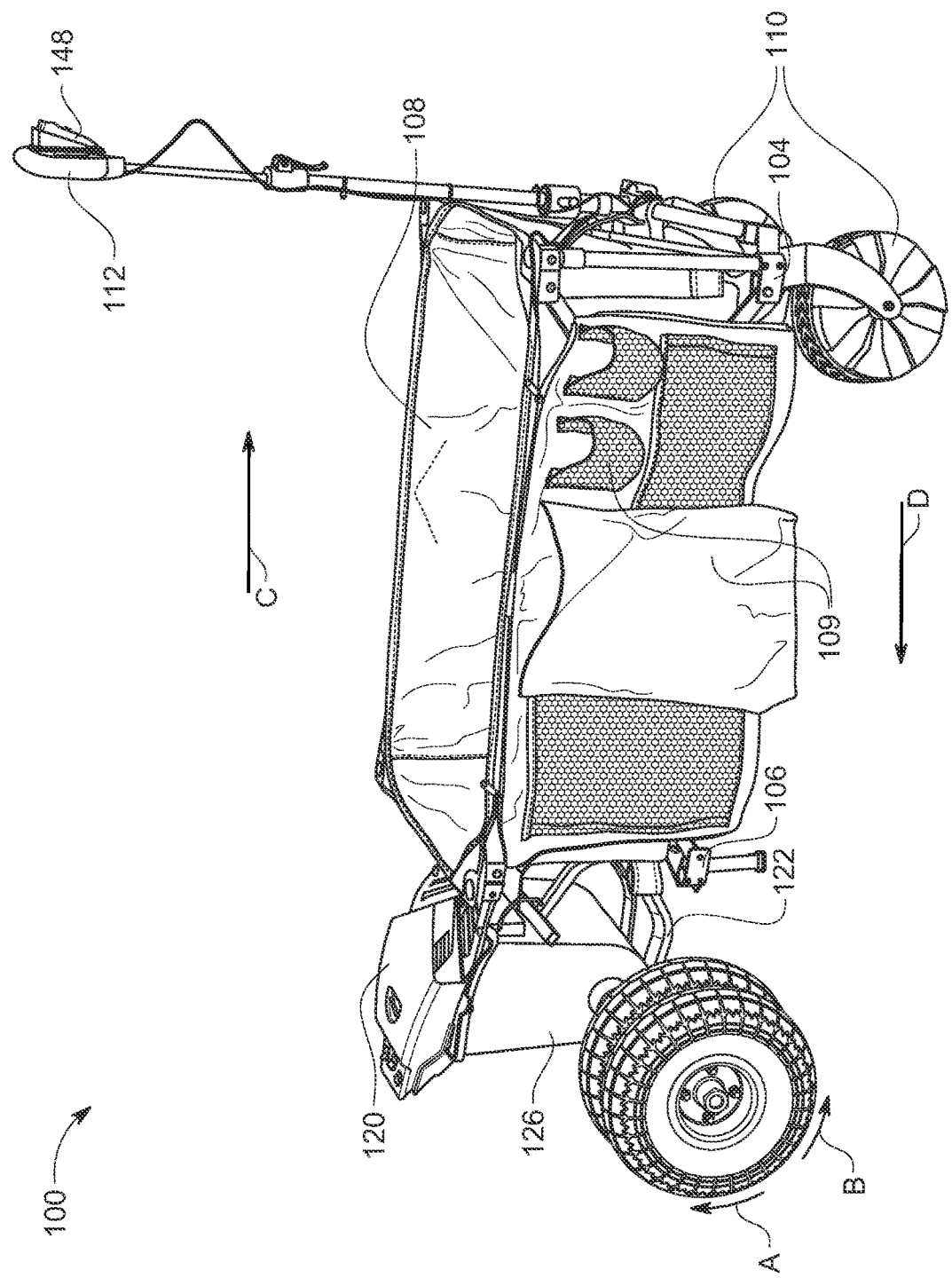
FIG. 2 is a left, partially perspective view thereof.

As illustrated in FIGS. 1-2, the motorized beach cart 100 has a collapsible frame 102. The collapsible frame 102 has a front end 104 opposite a back end 106. The collapsible frame 102 includes a transporting compartment 108 positioned between the front end 104 and the back end 106. The transporting compartment 108 is adapted to store and handle beach items. In a preferred embodiment, the transporting compartment 108 comprises at least one exterior storage pocket 109, and more preferably comprising a plurality of exterior storage pockets 109 as shown in FIG. 2.

Referring to FIGS. 1-2, the motorized beach cart 100 includes a pair of swivel wheels 110 oriented on opposite sides of the front end 104 of the collapsible frame 102. A handle 112 is hingedly connected to the front end 104 of the collapsible frame 102. The handle 112 is adapted for a grip of a hand of a user for grasping and steering the motorized beach cart 100.

Referring to FIGS. 1-14, the motorized beach cart 100 includes a drive assembly 120, which includes a rigid frame 122. As illustrated in FIGS. 4, 5, 9 and 11-12, the rigid frame 122 comprises a pair of clamps 124 that are removably connected to the back end 106 of the collapsible frame 102. In one embodiment, the back end 106 of the collapsible frame 102 includes an L-channel 107*b*, as exemplified in FIGS. 4-5, and the pair of clamps 124 are removably connected to the L-channel 107*b* of the back end 106 of the collapsible frame 102.

Figure 3:
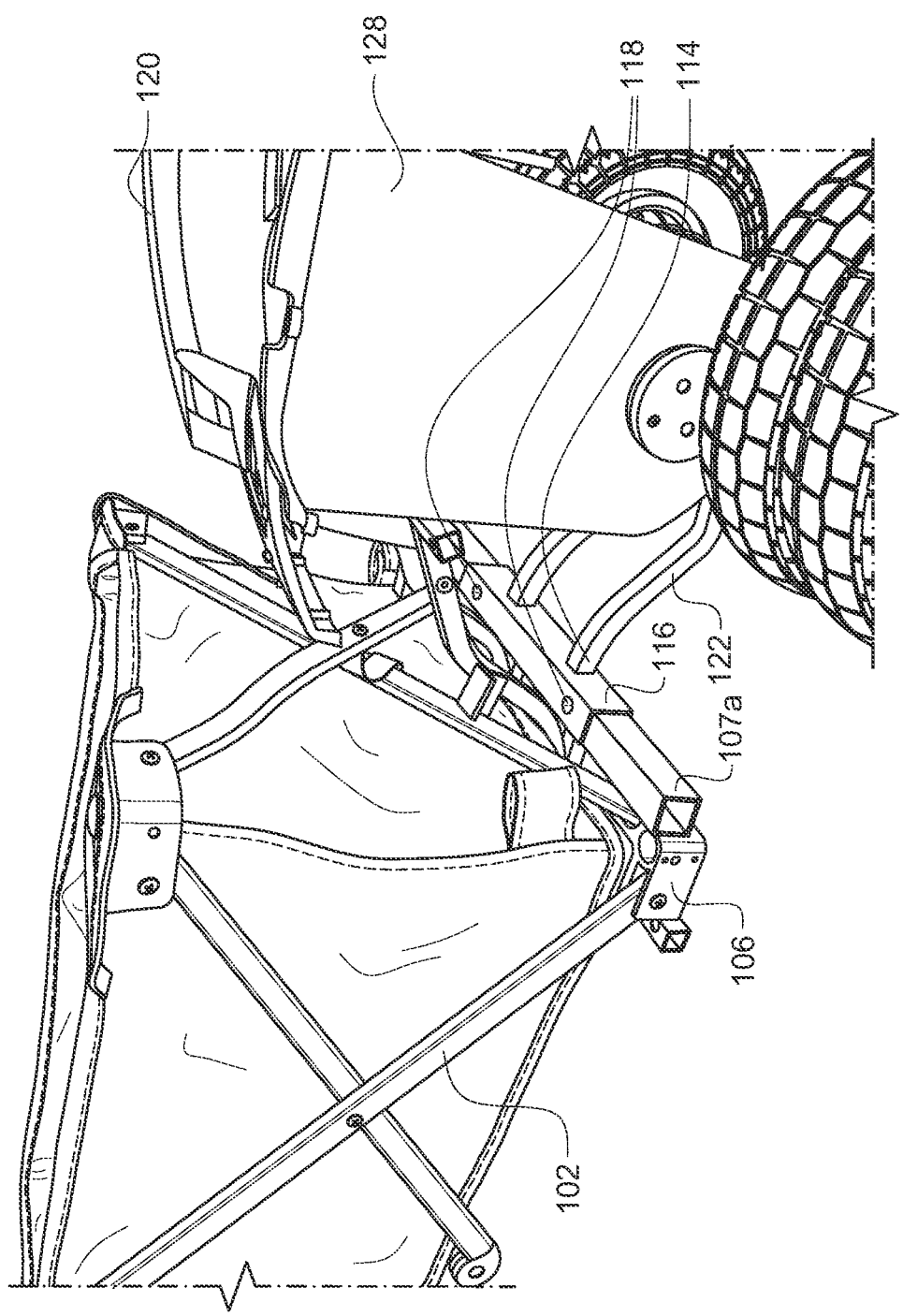
FIG. 3 is a back right perspective, partial view of an exemplary collapsible frame of a motorized beach cart with a drive assembly removably connected to a back end of the collapsible frame, illustrating exemplary clamps of the drive assembly in an open position, in accordance with embodiments of the invention.
Figure 4:
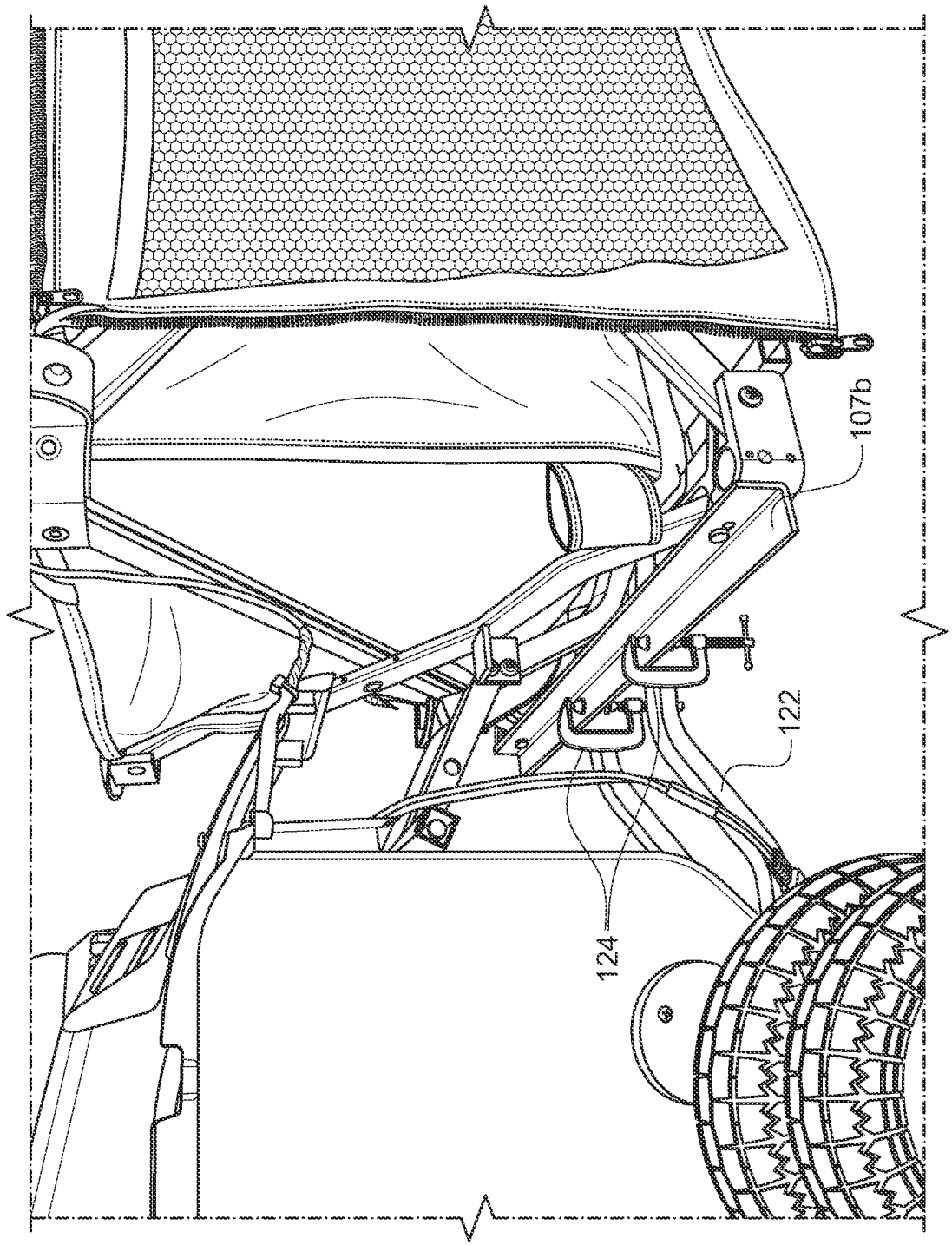
FIG. 4 is a back left perspective, partial view of an exemplary collapsible frame of a motorized beach cart with a drive assembly removably connected to a back end of the collapsible frame, illustrating exemplary clamps of the drive assembly in an closed position, in accordance with embodiments of the invention.
Figure 5:
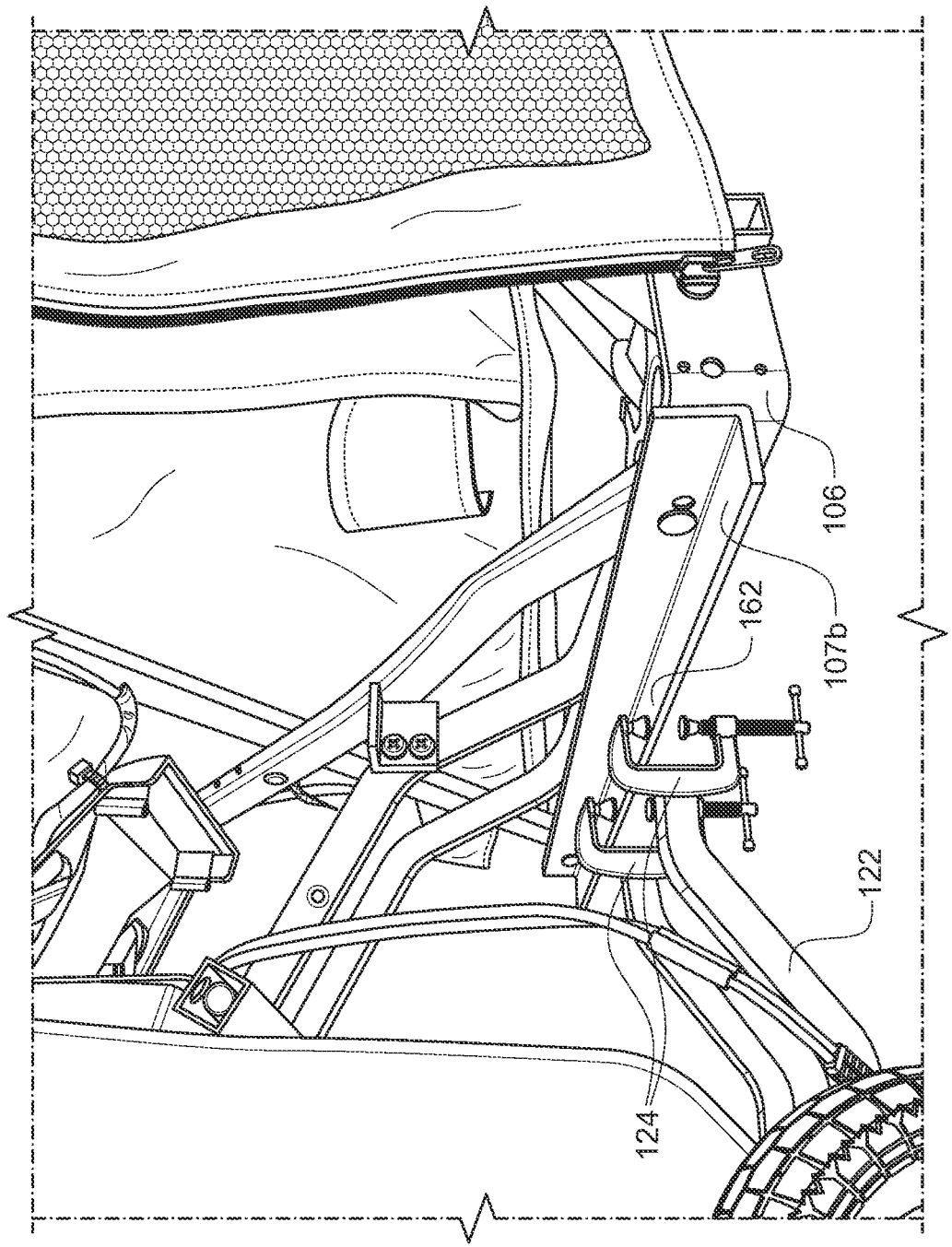
FIG. 5 is a back left perspective, partial view of an exemplary collapsible frame of a motorized beach cart with a drive assembly removably connected to a back end of the collapsible frame, illustrating exemplary clamps of the drive assembly in an open position, in accordance with embodiments of the invention.

Preferably, referring to FIG. 3, the back end 106 of the collapsible frame 102 has a rigid square tube 107*a* oriented laterally to the collapsible frame 102. As exemplified in FIGS. 3 and 10, the motorized beach cart 100 includes a drive assembly 120 which includes a rigid frame 122 having a front end 114 where the front end 114 preferably comprises a c-channel 116. The c-channel 116 is adapted to receive and secure the rigid square tube 107*a* such that the drive assembly 120 is removably connected to the back end 106 of the collapsible frame 102. The c-channel 116 includes apertures 118 which align with apertures in the square tube 107*a* so that a fastener such as a bolt 123 can be inserted through the apertures 118 of the c-channel 116 and respectively aligned apertures of the square tube 107*a* in order to quickly fasten and secure rigid frame 122 of the drive assembly 120 to the back end 106 of the collapsible frame 102.

The drive assembly 120 includes an electric motor 126 located within a protective casing 128. The protective casing 128 is mounted to the rigid frame 122.

Figure 8:
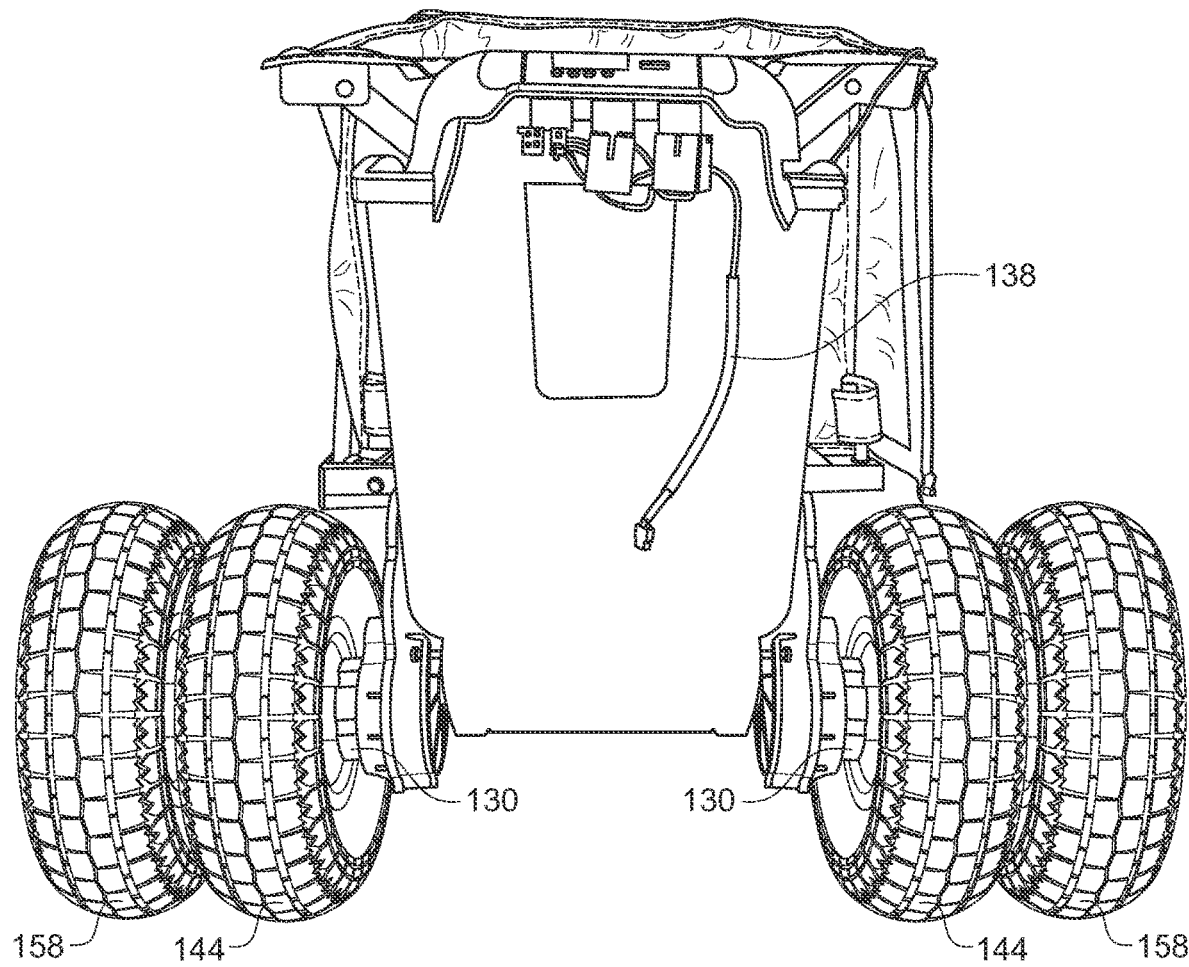
FIG. 8 is a back perspective view thereof in accordance with embodiments of the invention.
Figure 9:
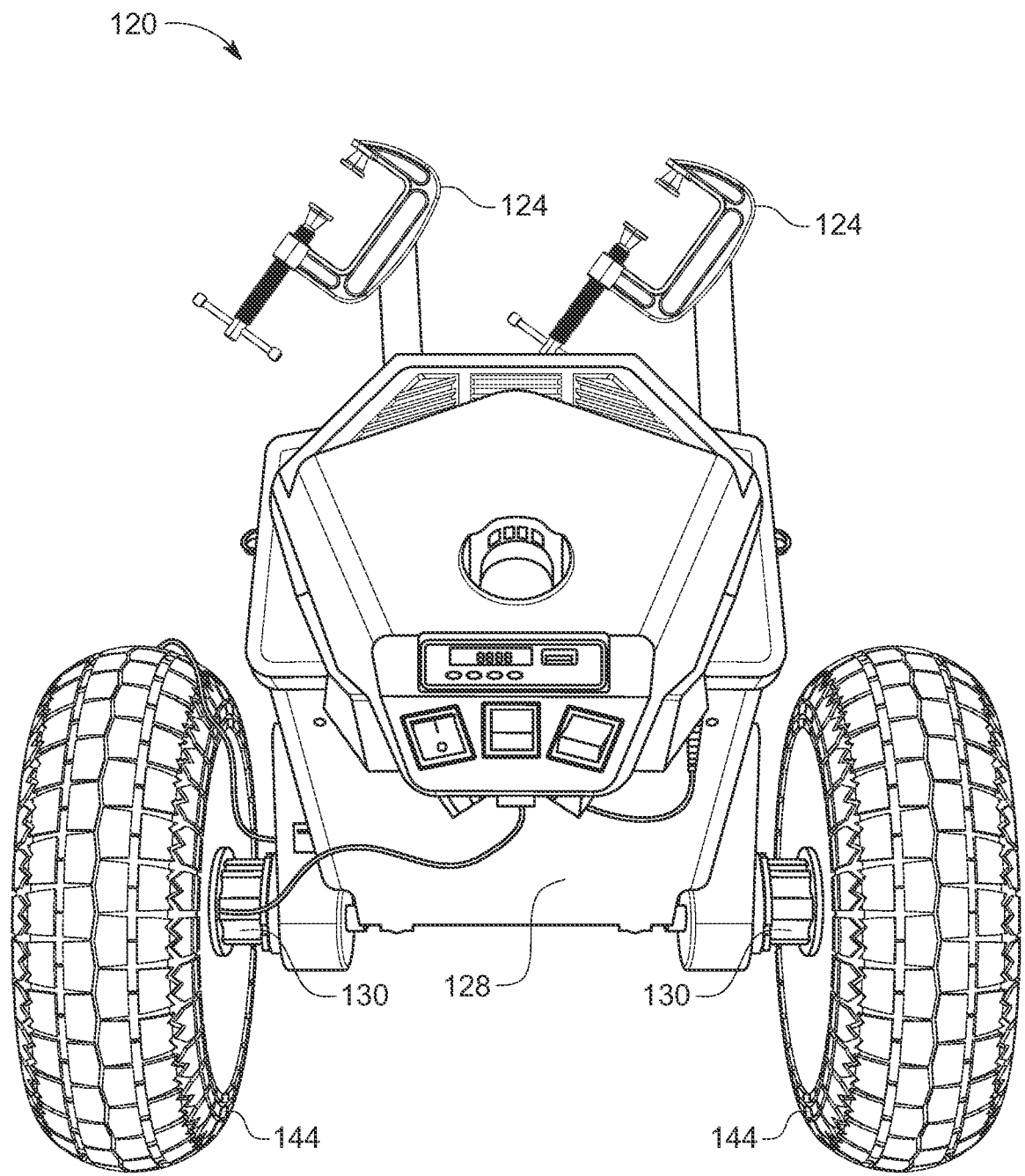
FIG. 9 is a top back perspective view of a drive assembly in accordance with embodiments of the invention.
Figure 10:
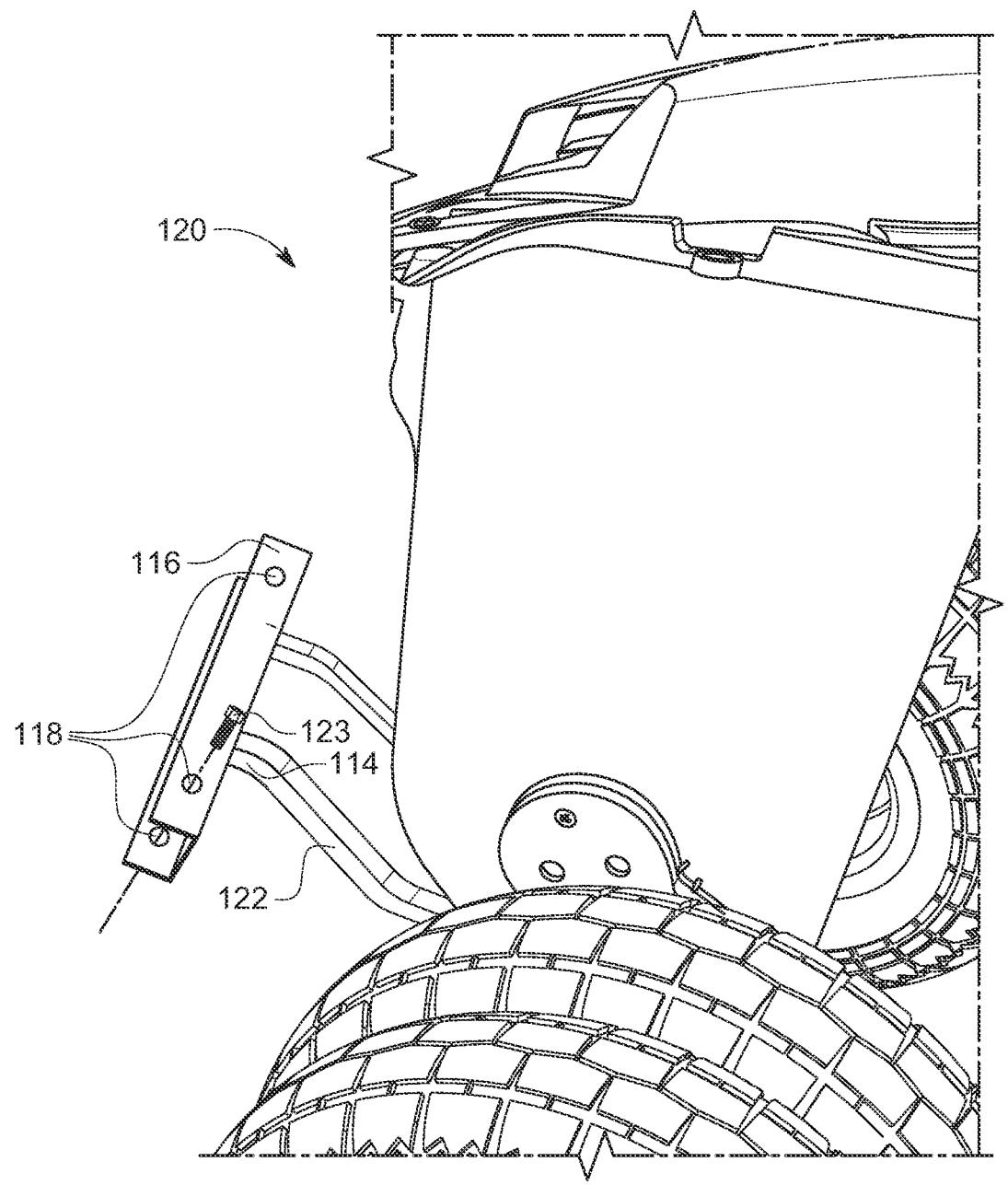
FIG. 10 is a right perspective, partial view of a drive assembly in accordance with embodiments of the invention.

Referring to FIGS. 8-9, the electric motor 126 is operatively connected to at least two drive shafts 130 which extend outward of the protective casing 128. Referring to FIG. 2, each of the at least two drive shafts 130 are adapted to rotate in a clockwise direction A and a counterclockwise direction B to propel the motorized beach cart 100 in a forward direction C or a backward direction D, as illustrated in FIG. 2.

Figure 11:
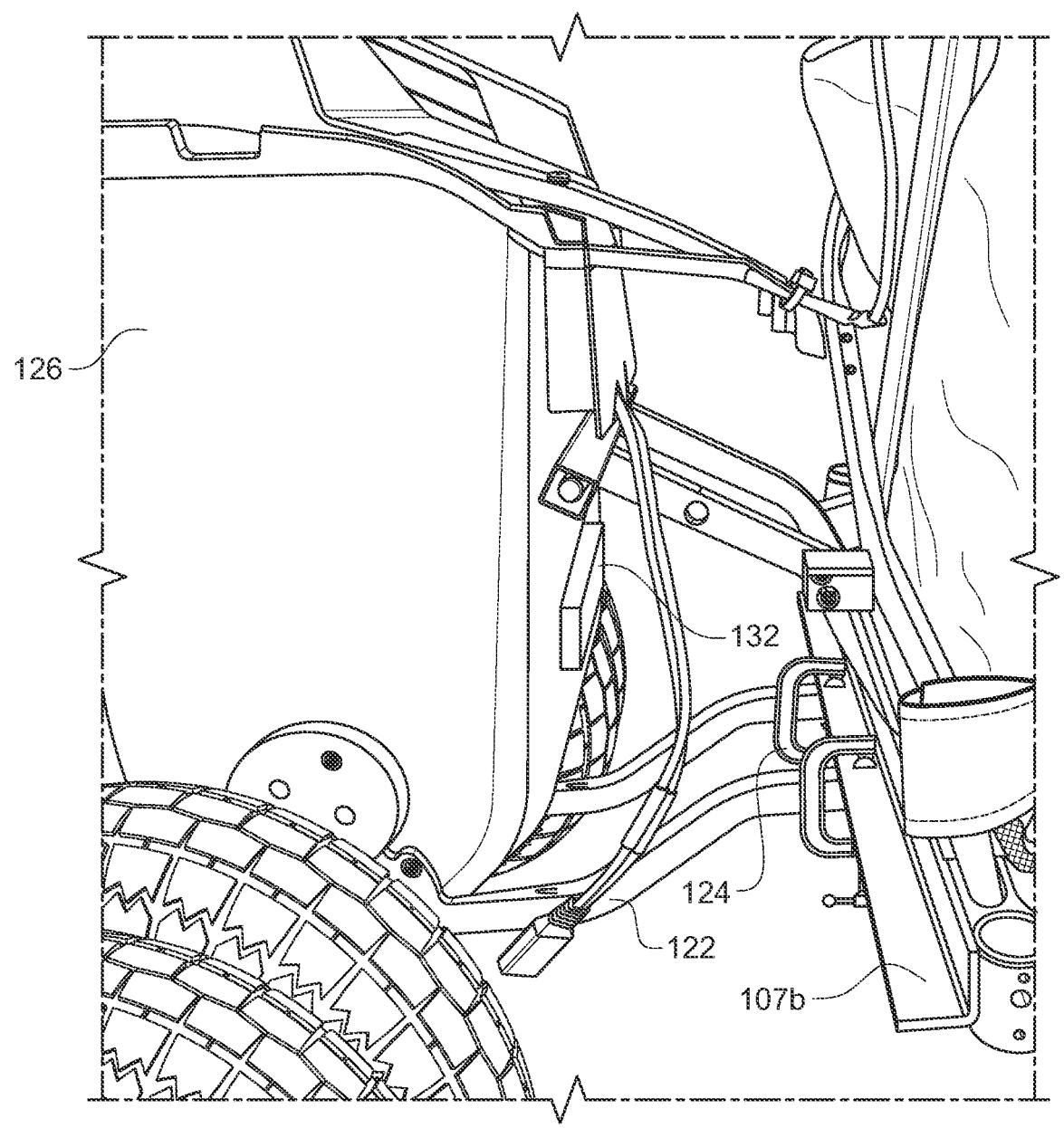
FIG. 11 is a left perspective, partial view of an exemplary drive assembly connected to an exemplary frame of a beach cart, in accordance with embodiments of the invention.
Figure 12:
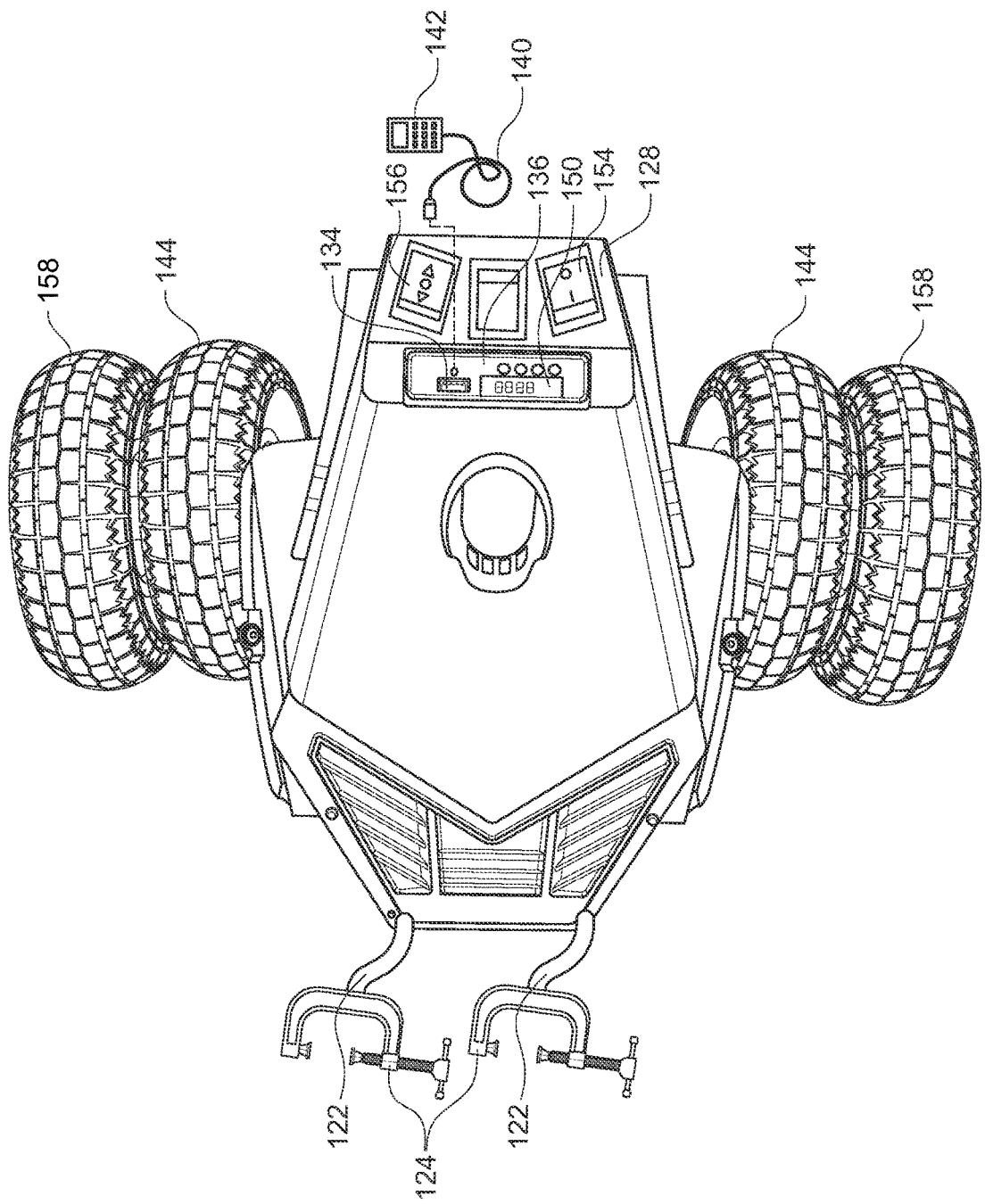
FIG. 12 is a top perspective view of a drive assembly in accordance with embodiments of the invention.
Figure 14:
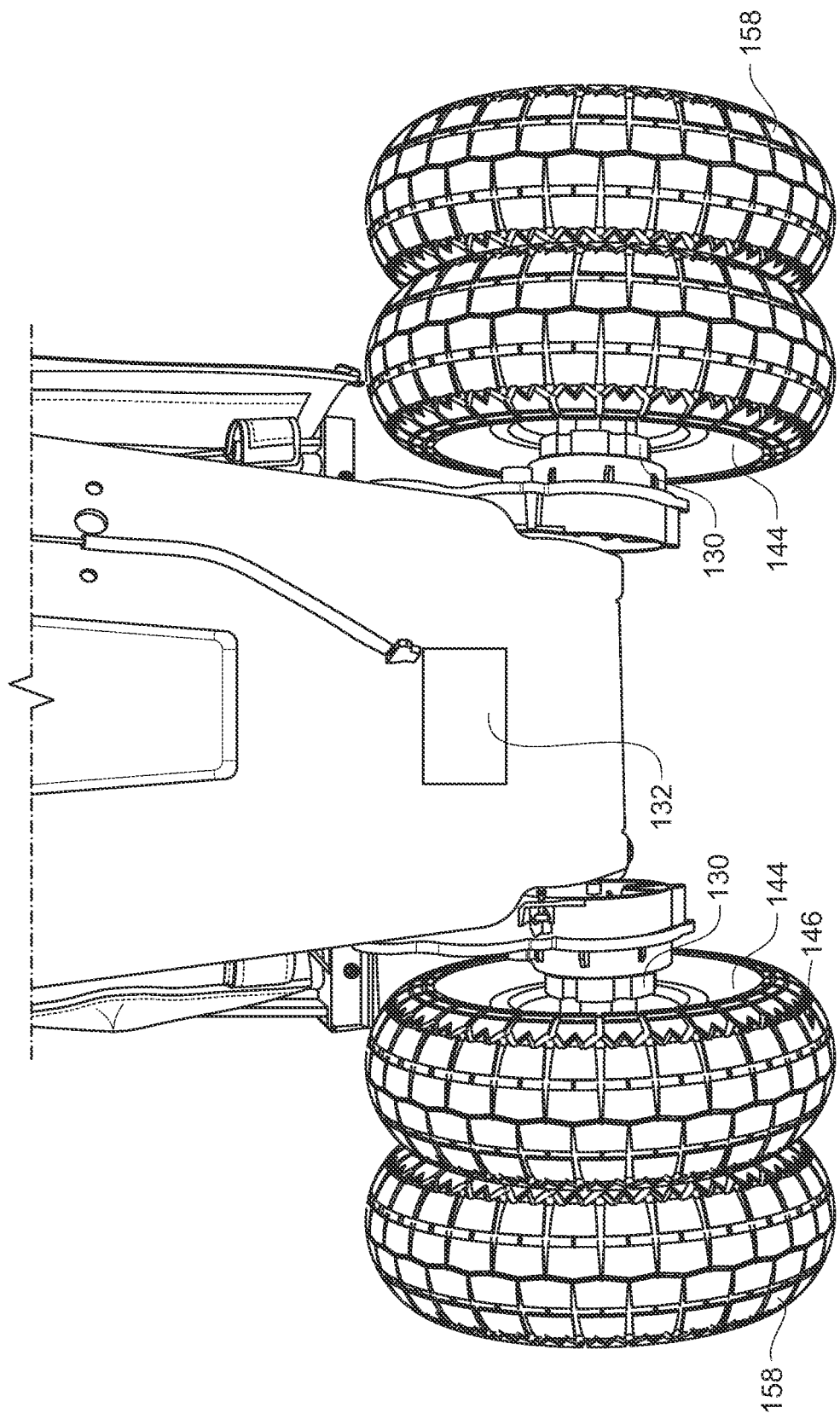
FIG. 14 is a back perspective view of a drive assembly in accordance with embodiments of the invention.

As exemplified in FIGS. 11 and 14, the motorized beach cart 100 includes a battery 132 electrically wired to the electric motor 126 within the protective casing 128. As illustrated in FIG. 12, in a preferred embodiment, at least a first USB port 134 is located within an exterior wall 136 of the protective casing 128 and is electrically connected to the battery 132.

Preferably, the at least first USB port 134 is adapted to receive a charging cable 138 as exemplified in FIG. 12 which is adapted to charge a cell phone 142. In such embodiment, a user can charge the user's cell phone 142 while using the motorized beach cart 100.

In one embodiment, the drive assembly 120 comprises a charging power cord 140 as exemplified in FIG. 8 which is adapted to charge the battery 132. In another embodiment, the at least first USB port 134 is adapted to receive a charging power cord 140 which is adapted to charge the battery 132.

Referring to FIGS. 6-10, the motorized beach cart 100 includes at least a first pair of drive wheels 144 having treads oriented on an exterior surface 146 thereon. Each drive wheel 144 of the at least a first pair of drive wheels 144 is rotatably connected to one of the at least two drive shafts 130.

Preferably, an accelerator switch 148 is mounted to the handle 112 as illustrated in FIG. 2 and is removably electrically coupled to the electric motor 126. The accelerator switch 148 is adapted to electrically activate the electric motor 126 to rotate the at least two drive shafts 130, in a clockwise direction A and a counterclockwise direction B to propel the motorized beach cart 100 in a forward direction C or a backward direction D, respectively.

In one embodiment, the drive assembly 120 further includes an LCD screen 150, which is adapted to display a charge level 152 of the battery 132.

Figure 13:
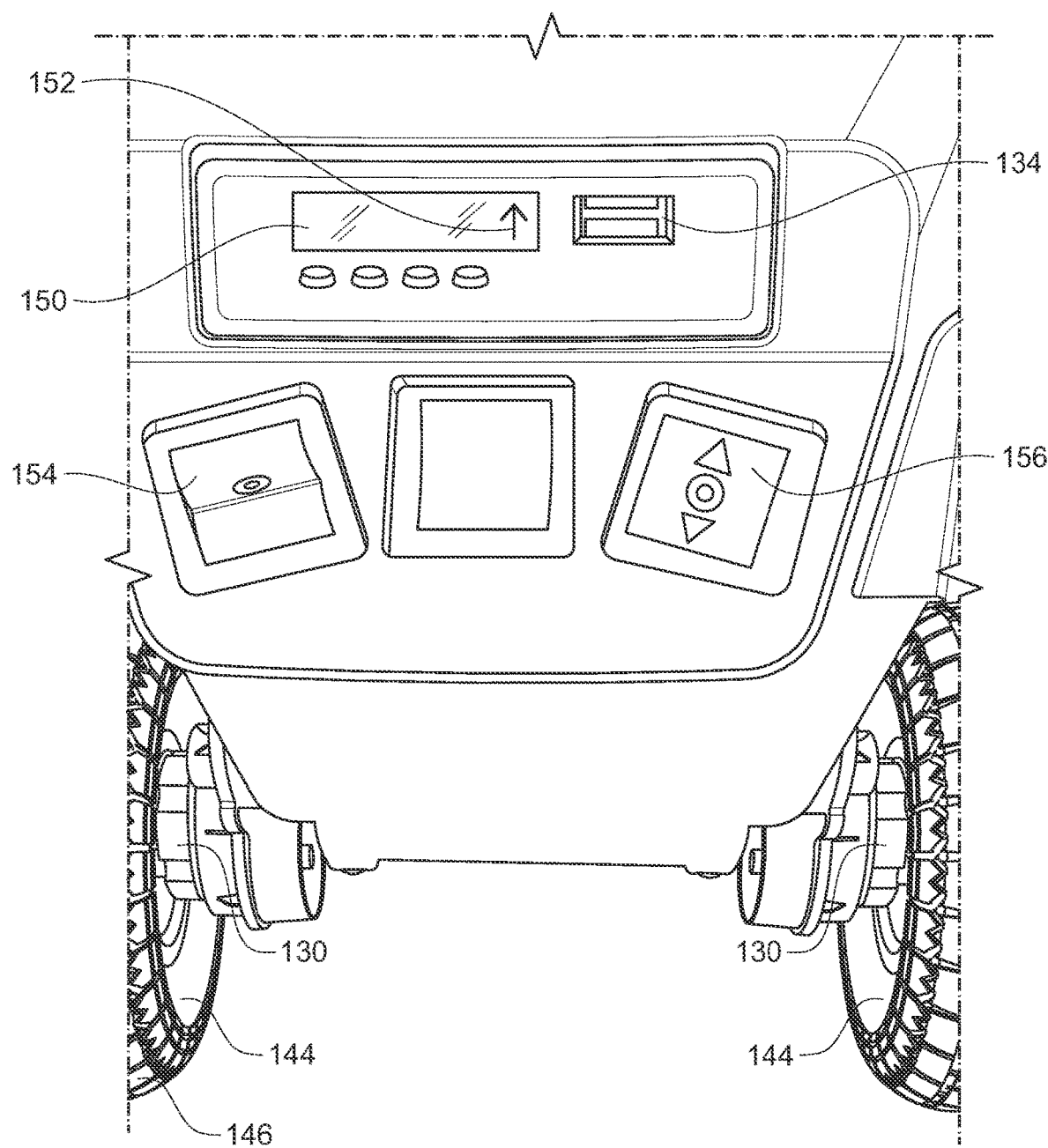
FIG. 13 is a top back perspective, partial view of an exemplary drive assembly in accordance with embodiments of the invention.

Referring to FIG. 13, in another embodiment, the motorized beach cart 100 further includes a speed switch 154, which is electrically connected to the electric motor 126. The speed switch 154 is adapted to rotate each of the at least two drive shafts 130 at a slow speed and a fast speed, at an option of the user 118.

Referring to FIG. 13, in yet another embodiment, the motorized beach cart 100 further includes a directional switch 156 electrically connected to the electric motor 126. The directional switch 156 is adapted to rotate each of the at least two drive shafts 130 in the clockwise direction A and the counterclockwise direction B, as illustrated in FIG. 2.

As seen in the embodiments illustrated in FIGS. 2, 7-8, 12 and 14, the motorized beach cart 100 further preferably includes at least a second pair of drive wheels 158. Each drive wheel 158 of the at least a second pair of drive wheels 158 is operatively connected to one of the at least two drive shafts 130, respectively. Preferably, each drive wheel 158 of the at least a second pair of drive wheels 158 is rigidly connected to each drive wheel 144 of the at least a first pair of drive wheels 144 respectively.

Figure 6:
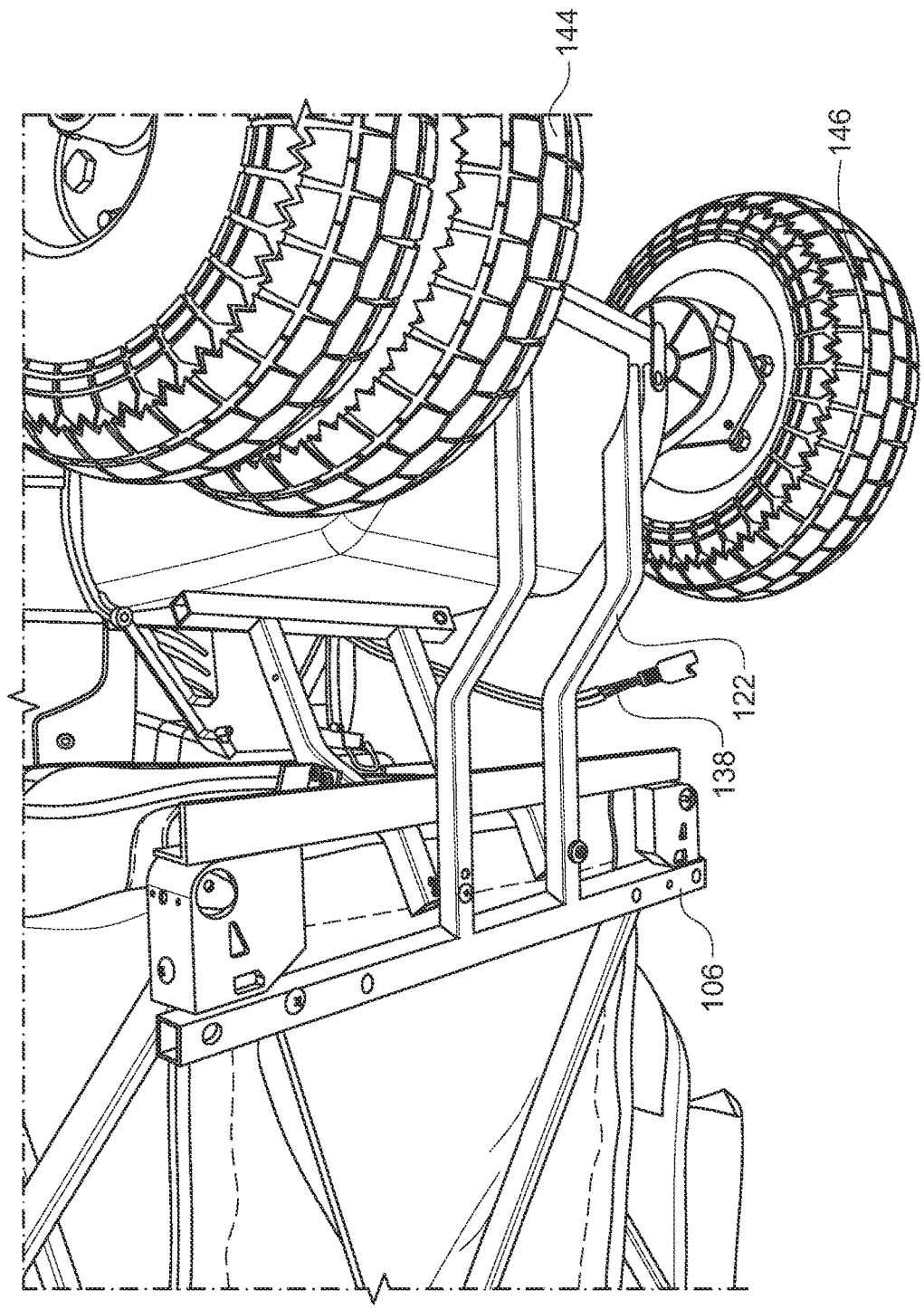
FIG. 6 is a bottom right perspective, partial view thereof, in accordance with embodiments of the invention.
Figure 7:
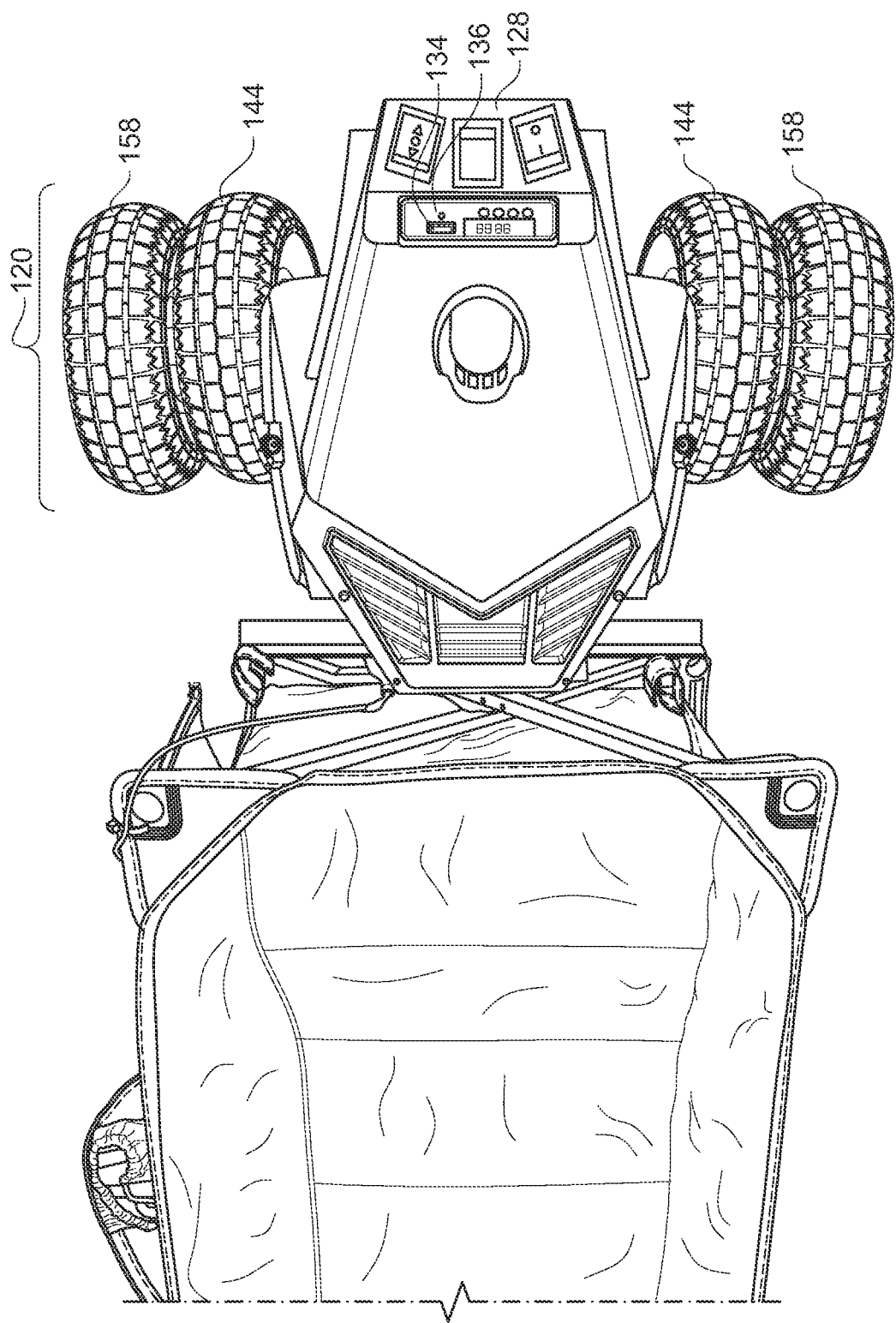
FIG. 7 is a top perspective, partial view of an exemplary motorized beach cart, in accordance with embodiments of the invention.

Referring to FIG. 6, in one embodiment, a motorized beach cart 100 is provided comprising a drive assembly 120 having a rigid frame 122 that is permanently fixed to a back end 106 of a beach cart.

Referring to FIGS. 7-14, a drive assembly 120 in accordance with embodiments of the invention is presented. In one embodiment, the drive assembly 120 includes a rigid frame 122 having a pair of vise clamps 124 removably attachable to a back end 106 of a collapsible beach cart frame 102. The collapsible beach cart frame 102 has a handle 112 adapted for a grip of a hand of a user for grasping and steering the beach cart frame 102 as illustrated in FIGS. 8-9.

The drive assembly 120 includes an electric motor 126 located within a protective casing 128 fixed to the rigid frame 122. The electric motor 126 is operatively connected to at least two drive shafts 130 which extend outward of the protective casing 128. As illustrated in FIG. 2, each of the at least two drive shafts 130 are adapted to rotate in a clockwise direction A and a counterclockwise direction B to propel the collapsible beach cart 100 in a forward direction C or a backward direction D, as exemplified in FIG. 2. The drive assembly 120 preferably includes a removable battery 132, which is electrically wired to the electric motor 126 within the protective casing 128.

Preferably, the drive assembly 120 includes at least a first USB port 134 oriented within an exterior wall 136 of the protective casing 128 and electrically connected to the battery 132. The at least first USB port 134 is adapted to receive a charging power cord 138, which is adapted to charge the battery 132.

As illustrated in FIG. 12, the at least first USB port 134 is adapted to receive a charging cable 140, which is adapted to charge a cell phone 142.

The drive assembly 120 includes at least a first pair of drive wheels 144 having treads oriented on an exterior surface 146 thereon, and each drive wheel 144 of the at least a first pair of drive wheels 144 is rotatably connected to one of the at least two drive shafts 130.

The drive assembly 120 preferably includes an accelerator switch 148, which is removably mounted to the handle 112 of the collapsible beach cart 100. The accelerator switch 148 is electrically coupled to the electric motor 126 and the accelerator switch 148 is adapted to electrically activate the electric motor 126 to rotate the at least two drive shafts 130.

In one embodiment, the drive assembly 120 further includes an LCD screen 150, which is adapted to display a charge level 152 of the battery 132.

In another embodiment, the drive assembly 120 further includes a speed switch 154 electrically connected to the electric motor 126. The speed switch 154 is adapted to rotate each of the at least two drive shafts 130 at a slow speed and a fast speed, at an option of the user 118.

In yet another embodiment, the drive assembly 120 further includes a directional switch 156, which is electrically connected to the electric motor 126. The directional switch 156 is adapted to rotate each of the at least two drive shafts 130 in the clockwise direction A and the counterclockwise direction B.

In one embodiment, the drive assembly 120 further includes at least a second pair of drive wheels 158. Each drive wheel 158 of the at least a second pair of drive wheels 158 is operatively connected to each drive shaft 130 of the at least two drive shafts 130, respectively. Each drive wheel 158 of the at least a second pair of drive wheels 158 is rigidly connected to each drive wheel 144 of the at least a first pair of drive wheels 144.

Figure 15:
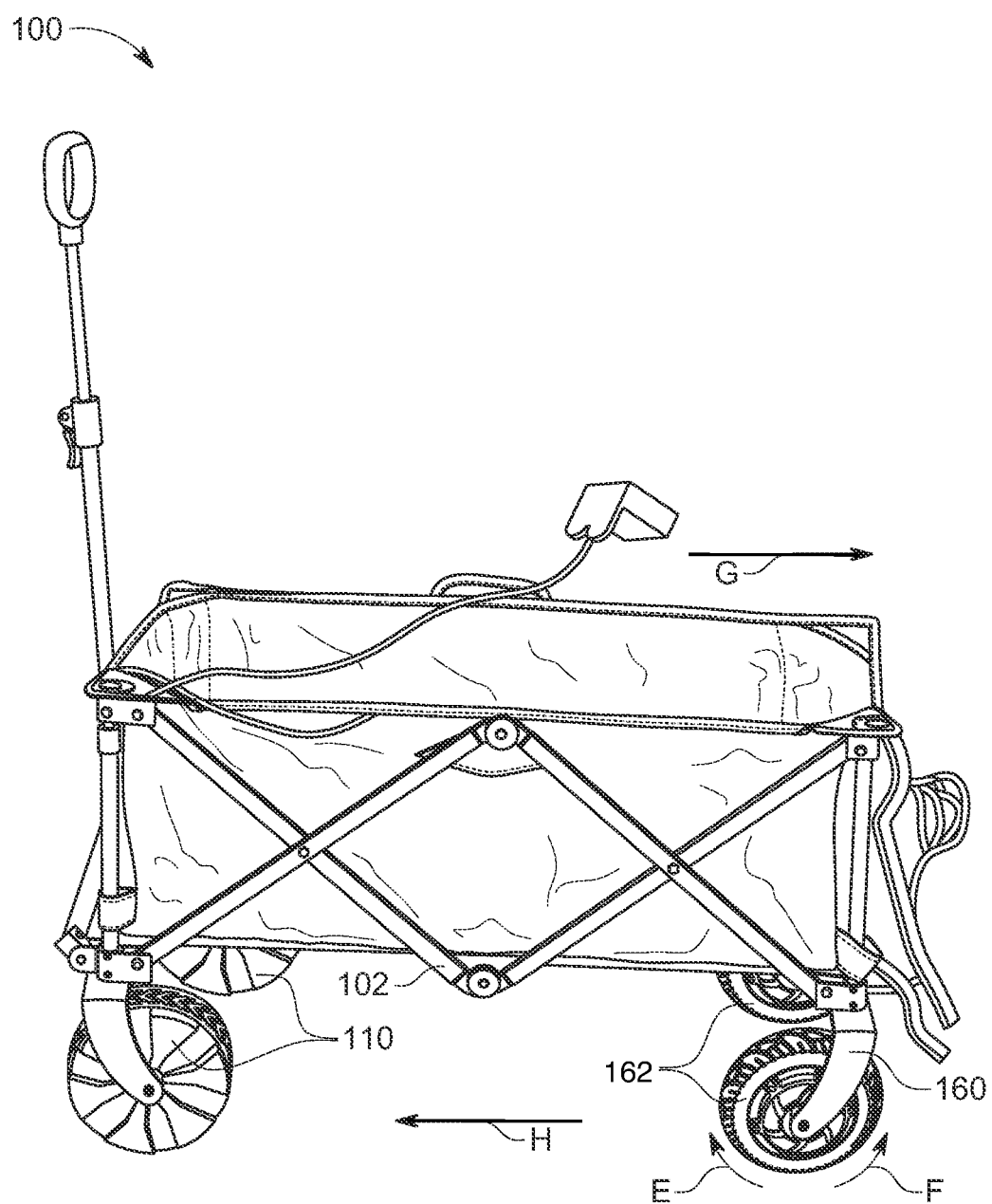
FIG. 15 is a right perspective view of an exemplary motorized beach cart in accordance with embodiments of the invention.
Figure 16:
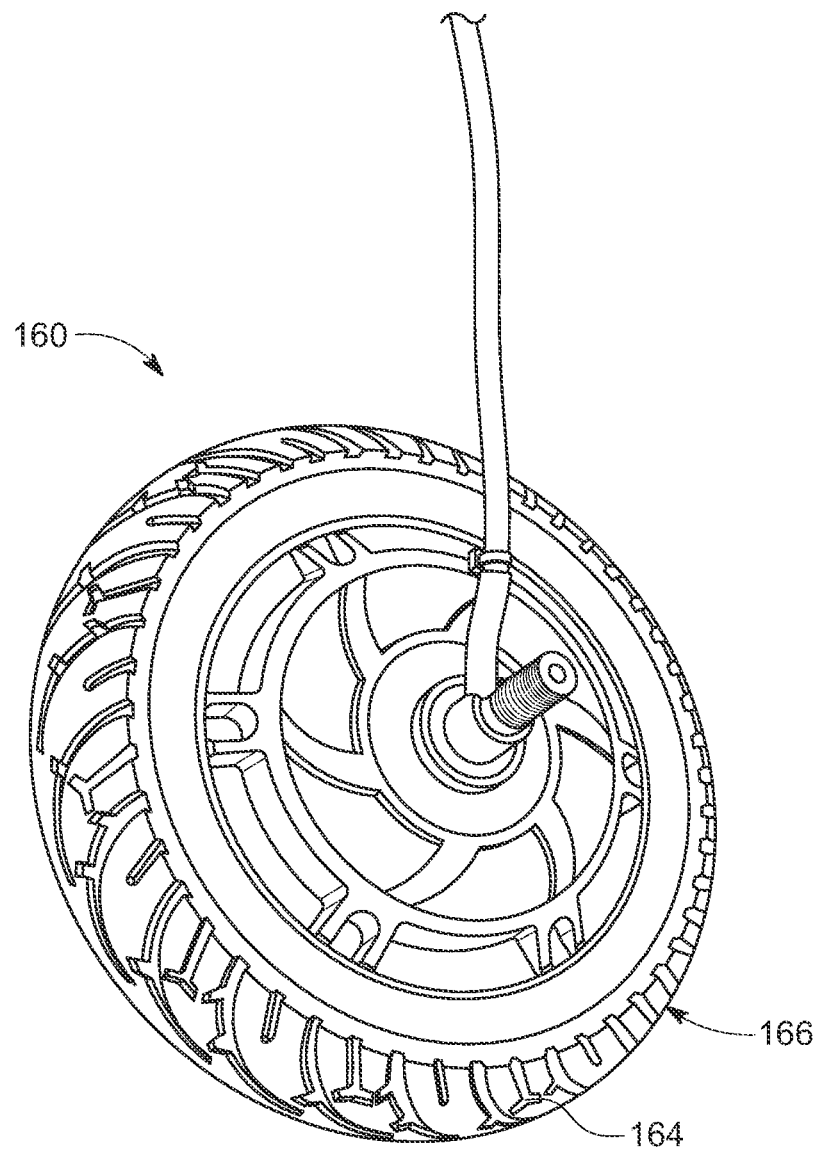
FIG. 16 is a right perspective view of an exemplary hub motor drive wheel of the motorized beach cart of FIG. 15 in accordance with embodiments of the invention.
Figure 17:
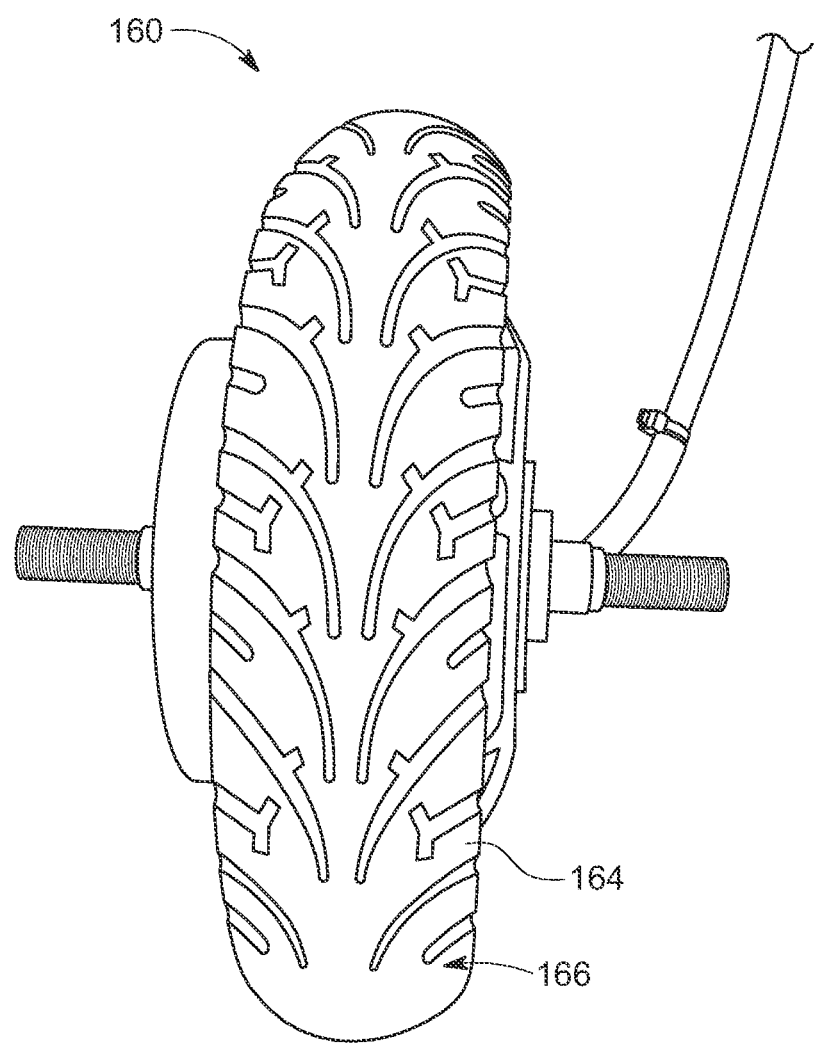
FIG. 17 is a top perspective view thereof in accordance with embodiments of the invention.

Referring to FIGS. 15-17, in a preferred embodiment, a motorized beach cart 100 in accordance with embodiments of the invention is provided. The motorized beach cart 100 includes a collapsible frame 102 having a front end 104 opposite a back end 106. The collapsible frame 102 includes a transporting compartment 108 located between the front end 104 and the back end 106. The transporting compartment 108 is adapted to store and handle beach items.

Referring to FIGS. 15-17, the motorized beach cart 100 includes a pair of swivel wheels 110 oriented on opposite sides of the front end 104 of the collapsible frame 102. In a preferred embodiment, a handle 112 is hingedly connected to the front end 104 of the collapsible frame 102. The handle 112 is adapted for a grip of a hand of a user for steering the motorized beach cart 100. A rear fork 160 is rotatably connected to the back end 106 of the collapsible frame 102.

Referring to FIG. 15, preferably, there are two hub motor drive wheels 162 that provide for at least a first pair of hub motor drive wheels 162, where each hub motor drive wheel 162 is oriented on an opposite side of the back end 106 of the collapsible frame 102. Each hub motor drive wheel 162 of the at least first pair of drive wheels 162 internally includes an electric wheel motor. Each electric wheel motor includes a rotor assembly coupled with a stator of each respective hub motor drive wheel 162.

Each of the at least a first pair of hub motor drive wheels 162 has treads 164 oriented on an exterior surface 166 of each of the at least first pair of drive wheels 168. Each hub motor drive wheel is rotatably connected to the back end 106 of the collapsible frame 102, as exemplified in FIG. 15. The stator is surrounded by the rotor assembly and configured to drive the rotor assembly with electromotive force. The rotor assembly is adapted to rotate in a clockwise direction E and a counterclockwise direction F, which propels the motorized beach cart 100 in a backwards direction G or a forward direction H, respectively.

In such preferred embodiment, the motorized beach cart 100 includes a battery 132 located within a protective casing 128. The protective casing 128 is mounted onto the back end 106 of the collapsible frame 102 and electrically connected to the rotor assembly of the hub motor drive wheel 162.

Preferably, at least a first USB port 134 is disposed within an exterior wall 136 of the protective casing 128 and electrically connected to the battery 132. The at least first USB port 134 is adapted to receive a charging power cord 138, as illustrated in the embodiment of FIG. 8, which is adapted to charge the battery 132.

In a preferred embodiment, the at least first USB port 134 is adapted to receive a charging cable 140, which is adapted to charge a cell phone 142, as illustrated in FIG. 12. The motorized beach cart 100 includes an accelerator switch 148 mounted to the handle 112, as illustrated in FIG. 2. The accelerator switch 148 is electrically coupled to the rotor assembly of the hub motor drive wheel 162 and is adapted to electrically activate the rotor assembly of the hub motor drive wheel 162 to rotate each hub motor drive wheel 162 of the at least first pair of drive wheels 144 at the option of the user.

In one embodiment, the motorized beach cart 100 further includes an LCD screen 150, which is adapted to display a charge level 152 of the battery 132.

In another embodiment, the motorized beach cart 100 further includes a speed switch 154, which is electrically connected to the rotor assembly of the hub motor drive wheel 162 and and which is adapted to rotate each hub motor drive wheel 162 of the at least a first pair of drive wheels 162 at a slow speed and a fast speed, at an option of the user.

In yet another embodiment, the motorized beach cart 100 further includes a directional switch 156, which is electrically connected to the rotor assembly of the hub motor drive wheel 162 and which is adapted to rotate each hub motor drive wheel 162 of the at least first pair of hub motor drive wheels 162 in the clockwise direction E and the counterclockwise direction F.

In one embodiment, the motorized beach cart 100 further includes at least a second pair of hub motor drive wheels. Each of the at least a second pair of hub motor drive wheels 162 are operatively connected to the collapsible frame 102. Preferably, each hub motor drive wheel 162 of the at least second pair of hub motor drive wheels 162 is rigidly connected to each of the at least a first pair of drive wheels.

All U.S. patents and publications identified herein are incorporated in their entirety by reference thereto.

The invention claimed is:

1. A motorized beach cart comprising:
   a collapsible frame having a front end opposite a back end, said collapsible frame comprising a transporting compartment disposed between said front end and said back end, said transporting compartment adapted to store and handle beach items, said back end having a rigid square tube;
   a pair of swivel wheels disposed on opposite sides of the front end of the collapsible frame;
   a handle hingedly connected to the front end of the collapsible frame, said handle adapted for a grip of a hand of a user for pulling and steering the motorized beach cart;
   a drive assembly comprising a rigid frame having a front end, said front end comprising a c-channel, said c-channel adapted to receive and secure the rigid square tube such that the drive assembly is removably connected to the back end of the collapsible frame;
   said drive assembly comprising an electric motor disposed within a protective casing mounted to the rigid frame, said electric motor operatively connected to at least two drive shafts which extend outward of the protective casing, each of said at least two drive shafts adapted to rotate in a clockwise direction and a counterclockwise direction to propel the motorized beach cart in a forward direction or a backward direction;
   a battery electrically wired to the electric motor within the protective casing;
   at least a first USB port disposed within an exterior wall of the protective casing and electrically connected to the battery, said at least a first USB port adapted to receive a charging power cord adapted to charge the battery, said at least first USB port adapted to receive a charging cable adapted to charge a cell phone;
   at least a first pair of drive wheels comprising treads disposed on an exterior surface thereon, each drive wheel of the at least a first pair of drive wheels rotatably connected to one of the at least two drive shafts; and
   an accelerator switch mounted to the handle, said accelerator switch removably electrically coupled to the electric motor, said accelerator switch adapted to electrically activate the electric motor to rotate the at least two drive shafts.

2. The motorized beach cart of claim 1, said drive assembly further comprising an LCD screen adapted to display a charge level of the battery.

3. The motorized beach cart of claim 1, further comprising a speed switch electrically connected to the electric motor adapted to rotate each of the at least two drive shafts at a slow speed and a fast speed, at an option of the user.

4. The motorized beach cart of claim 1, further comprising a directional switch electrically connected to the electric motor adapted to rotate each of the at least two drive shafts in the clockwise direction and the counterclockwise direction.

5. The motorized beach cart of claim 1, further comprising at least a second pair of drive wheels, wherein each of the at least a second pair of drive wheels is operatively connected to each of the at least two drive shafts, wherein each of the at least a second pair of drive wheels is rigidly connected to each of the at least a first pair of drive wheels.

6. A drive assembly comprising:
   a rigid frame comprising a pair of vise clamps removably attachable to a back end of a frame member of a collapsible beach cart, said collapsible beach cart comprising a handle adapted for a grip of a hand of a user for pulling and steering the collapsible beach cart;
   an electric motor disposed within a protective casing fixed to the rigid frame, said electric motor operatively connected to at least two drive shafts which extend outward of the protective casing, each of said at least two drive shafts adapted to rotate in a clockwise direction and a counterclockwise direction to propel the collapsible beach cart in a forward direction or a backward direction;
   a battery electrically wired to the electric motor within the protective casing;
   at least a first USB port disposed within an exterior wall of the protective casing and electrically connected to the battery, said at least a first USB port adapted to receive a charging power cord adapted to charge the battery, said at least first USB port adapted to receive a charging cable adapted to charge a cell phone;
   at least a first pair of drive wheels comprising treads disposed on an exterior surface thereon, each drive wheel of the at least a first pair of drive wheels rotatably connected to one of the at least two drive shafts; and
   an accelerator switch removably mounted to the handle of the collapsible beach cart, said accelerator switch electrically coupled to the electric motor, wherein said accelerator switch adapted to electrically activate the electric motor to rotate the at least two drive shafts.

7. The drive assembly of claim 6, further comprising an LCD screen adapted to display a charge level of the battery.

8. The drive assembly of claim 6, further comprising a speed switch electrically connected to the electric motor adapted to rotate each of the at least two drive shafts at a slow speed and a fast speed, at an option of the user.

9. The drive assembly of claim 6, further comprising a directional switch electrically connected to the electric motor adapted to rotate each of the at least two drive shafts in the clockwise direction and the counterclockwise direction.

10. The drive assembly of claim 6, further comprising at least a second pair of drive wheels, wherein each of the at least a second pair of drive wheels operatively connected to each of the at least two drive shafts, wherein each of the at least a second pair of drive wheels rigidly connected to each of the at least a pair of drive wheels.

11. A motorized beach cart comprising:
    a collapsible frame having a front end opposite a back end, said collapsible frame comprising a transporting compartment disposed between said front end and said back end, said transporting compartment adapted to store and handle beach items;
    a pair of swivel wheels disposed on opposite sides of the front end of the collapsible frame;
    a handle hingedly connected to the front end of the collapsible frame, said handle adapted for a grip of a hand of a user for pulling and steering the motorized beach cart;
    at least a first pair of rear forks rotatably connected to the back end of the collapsible frame;
    at least a first pair of hub motor drive wheels disposed on opposite sides of the rear axle, wherein each hub motor drive wheel of the at least a first pair of hub motor drive wheels internally comprises an electric wheel motor, each electric wheel motor comprising a rotor assembly coupled with each of the at least a first pair of hub motor drive wheels, said hub motor drive wheels comprising treads disposed on an exterior surface of each hub motor drive wheel of the at least a first pair of hub motor drive wheels;

a stator coupled with each rear fork of the at least first pair of rear forks connected to the back end of the collapsible frame, each said stator surrounded by the respective rotor assembly, each said stator configured to drive the respective rotor assembly with electromotive force, each said rotor assembly adapted to rotate in a clockwise direction and a counterclockwise direction;

a battery disposed within a protective casing mounted onto the back end of the collapsible frame and electrically connected to the rotor assembly;

at least a first USB port disposed within an exterior wall of the protective casing and electrically connected to the battery, said at least a first USB port adapted to receive a charging power cord adapted to charge the battery, said at least first USB port adapted to receive a charging cable adapted to charge a cell phone; and an accelerator switch mounted to the handle, said accelerator switch electrically coupled to the rotor assembly, said accelerator switch adapted to electrically activate the rotor assembly to rotate each of the at least a first pair of drive wheels.

12. The motorized beach cart of claim 11, further comprising an LCD screen adapted to display a charge level of the battery.

13. The motorized beach cart of claim 11, further comprising a speed switch electrically connected to the rotor assembly adapted to rotate each of the at least a first pair of drive wheels at a slow speed and a fast speed, at an option of the user.

14. The motorized beach cart of claim 11, further comprising a directional switch electrically connected to the rotor assembly adapted to rotate each of the at least a first pair of drive wheels in the clockwise direction and the counterclockwise direction.

15. The motorized beach cart of claim 11, further comprising at least a second pair of drive wheels, each of the at least a second pair of drive wheels operatively connected to the rotor assembly, wherein each of the at least second pair of drive wheels is rigidly connected to each of the at least a first pair of drive wheels.

* * * * *